United States Patent [19]

Pentz et al.

[11] Patent Number: 4,770,546

[45] Date of Patent: Sep. 13, 1988

[54] TENSION BUSH

[76] Inventors: Michael Pentz, Josef-Henle-Str. 10, D-7918 Illertissen; Kurt Stetter, Gartenstrasse 36, D-7901 Illerrieden, both of Fed. Rep. of Germany

[21] Appl. No.: 20,193

[22] Filed: Feb. 26, 1987

[30] Foreign Application Priority Data

Feb. 26, 1986 [DE] Fed. Rep. of Germany ....... 3606140

[51] Int. Cl.⁴ .............................................. F16C 23/02
[52] U.S. Cl. .................................... 384/273; 384/295
[58] Field of Search .............. 384/192, 273, 272, 295; 29/525, 149.5 C, 451, 598; 277/220, 217, 216

[56] References Cited

U.S. PATENT DOCUMENTS 18,235  9/1857  Clark .................................... 277/216
3,009,747 11/1961 Pitzer .................................. 384/272
4,059,898 11/1977 Adair ................................... 29/598
4,211,149  7/1980 Hrusch ................................. 277/217

FOREIGN PATENT DOCUMENTS 1157856  6/1964  Fed. Rep. of Germany .
1258666 11/1968  Fed. Rep. of Germany .
2918350 11/1980  Fed. Rep. of Germany .

Primary Examiner—Lenard A. Footland
Attorney, Agent, or Firm—Lowe, Price, Leblanc, Becker & Shur

[57] ABSTRACT

A tension bush formed of resilient material has a longitudinal slot at least one of the two opposing slot face surfaces being provided with at least one projection for deforming engagement with the other slot face surface upon pressing-in of the bush into a tightly fitting bore.

7 Claims, 2 Drawing Sheets

TENSION BUSH

FIELD OF THE INVENTION

The invention relates to a tension bush and in particular to a tension bush formed of a resilient material by rolling and provided with a longitudinal slot. Such tension bushes are particularly used for bearing bushes for receiving bolts or the like with pressfit or sliding fit.

BACKGROUND ART

Commonly known tension bushes are provided with a slot having face surfaces and edges opposite and in parallel to each other. The outer diameter of the bush is selected such that the slot is not closed upon insertion of the bush into a bore by pressing. The resilient tensional forces necessary to retain the bush in the bore depend on the reduction of the diameter of the bush upon insertion and determine the strength of the fit. The latter further depends on the thickness of the wall of the bush. Thus, an increased resilient tensional force may only be achieved by using thicker material. However, both the thickness of the wall and the extent of change in diameter can be varied in relatively narrow limits only since with a small diameter the thickness of the wall must not exceed a certain amount since either the material surrounding the bore will lose its stability or a bolt to be inserted into the bush must have a small diameter resulting in weakness of the joint coupling. Furthermore, sheet material having an excessive thickness cannot be processed by rolling.

German Patent Specification No. 1,157,856 discloses a fixing pin comprising a bush provided with longitudinal slot and used for securing units and parts of electrical devices together. To increase the tensional force one of the edges of the slot is provided with projections engaging the opposite edge at bridge portions spanning over openings provided close to the edge of the slot such that the bridges are deformed. This results in a type of interlocking of the slot edges. However, deforming the slots causes only a rather limited increase of the tensional force which might be sufficient for purposes of locking pins but insufficient for achieving an optimum fit for tension bushes used as bearings. Furthermore, the deformation of the bridges result in projecting of material into the interior of the bush which projections are unacceptable for bushes used as a bearing having narrow tolerances. In addition, there is a danger of damaging the surface of the bolt or shaft inserted into a bush.

Another type of a tension bush is disclosed in German Patent Application No. 2,918,350, having a slot formed by generally parallel edges the slot having a v-like form such that upon pressing-in of the bush into a bore an opposing pair of slot edges egage and deform each other. Though this results in an increase of the fixing forces very high pressing-in pressures are necessary in view of the engagement of the two opposing edges along the overall length of the bush. Such high pressure may cause undesireable changes in the form of the material surrounding the bore, in particular, with thin-wall housings. A typical example are chain sidebars having thin-wall bridges which might easily burst. A further drawback of the known tension bush consists in the fact that they may be used with bores only having very narrow tolerances since the diameter of the bush must be such that the sharp slot edges contact each other upon pressing-in of the bush and deform only slightly. On the other hand, if the diameter of the bore is too large it might happen that there is only an insufficient or no contact of the slot edges. Consequently, there is no increase in the fixing forces. With too narrow a bore forces for pressing-in the bush rapidly increase with the danger of damage of the wall surrounding the bore or at least of deformation thereof.

SUMMARY OF THE INVENTION

It is an object of the invention to provide a tension bush offering considerably increased fixing forces.

It is a further object of the present invention to provide a tension bush having a fixed fit even in bores with wider tolerances.

These and other objects of the inventions are achieved by a tension bush comprising a bush formed of resilient material and being provided with a longitudinal slot formed by two spaced slot face surfaces and at least one projection at least at one slot face surface for deforming engagement with the other slot face surface.

The projection makes an essentially point contact with the opposing slot face surface. Preferably, one or more projections are made by embossing the outer edge of a slot face surface.

These projections engage the opposing face surface of the slot during pressing-in of the bush into a bore.

As a rule, one or more pointlike projections are spaced from the outer ends of the bush. To facilitate pressing-in of the bush, the front portion thereof may be formed conical which facilitates the inserting of the bush into the bore.

Preferably, the pointlike projections may be provided at one or several locations along one face surface of the slot depending on the overall length of the bush. Alternatively, the projections may be provided alternatingly or opposingly on the two opposing face surfaces of the slot. In all cases the benefit of the invention is achieved, even if the pointlike projections have different sizes.

According to a further embodiment of the invention one or even both face surfaces of the slot may be convexly formed. Again, this results in one or more pointlike projections deformable upon pressing-in of the bush in the bore.

DESCRIPTION OF PREFERRED EMBODIMENTS

The bushes of the embodiments may be produced in a well-known manner by rolling (see for instance according to German Standard DIN 1498). However, it should be noted, that in addition to spring steel 33 SI 7 according to German standard DIN 1722 in contrast to known bushes other steel types may be used with the bush according to the invention; the characteristics or such materials may be adapted to the specific bearing.

Figure 1:
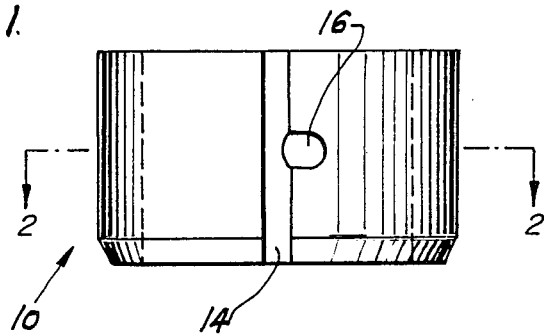
FIG. 1 is an elevational view of a rolled tension bush having a pointlike projection according to the invention.
Figure 2:
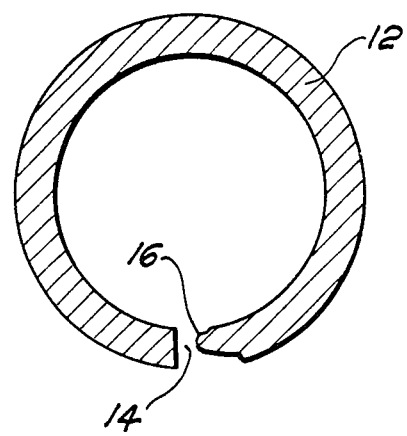
FIG. 2 is a sectional view of the tension bush of FIG. 1 taken along the line 2—2 in FIG. 1.

FIGS. 1 and 2 illustrate a first embodiment of a tension bush 10 according to the invention having a generally cylindrical wall 12 provided with a longitudinal slot 14 left open upon completion of the rolling process.

According to the invention at least one pointlike projection 16 is provided at least at one slot edge or face surface. Such a projection 16 may be formed before or after rolling, preferably, by embossing or depressing (viz. also FIG. 2). Preferably, the opposing end regions of the bushes are left free from pointlike projections 16.

Figure 3:
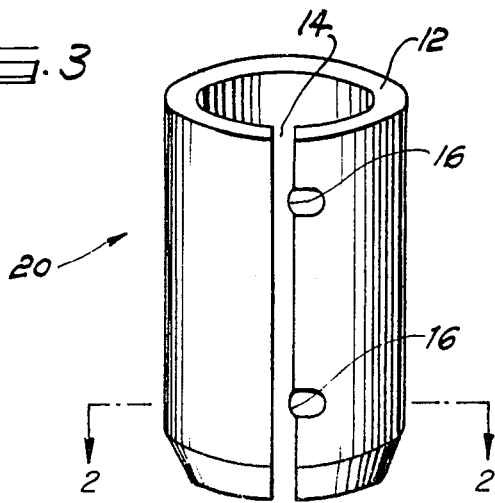
FIG. 3 is a perspective view of a rolled tension bush having a plurality of pointlike projections.

FIG. 3 shows a further embodiment of a tension bush 20 according to the invention being provided with two pointlike projections 16. As mentioned before such pointlike projections 16 may be provided on both face surfaces of the slot either in opposition or offset to each other.

Figure 4:
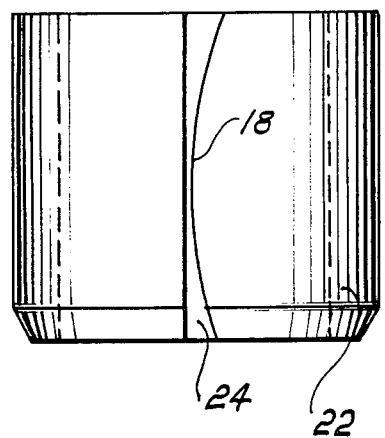
FIG. 4 is a schematic elevational view of a rolled tension bush having one slot face surface convexly shaped.
Figure 5:
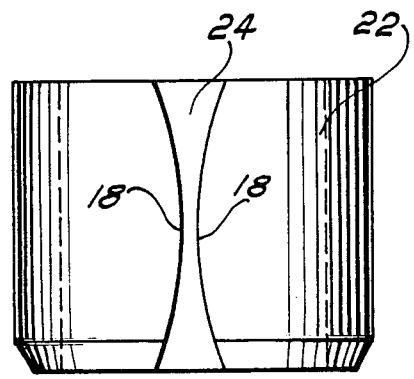
FIG. 5 is a schematic elevational view of a rolled tension bush having both slot face surfaces convexly formed.

FIGS. 4 and 5 show further embodiments of tension bushes according to the invention where the pointlike projections of the embodiments according to FIGS. 1 to 3 are replaced by a convex shape of at least one of slot face surfaces 18.

As mentioned before, with known tension bushes the bore into which the bush is to be pressed-in must not be too narrow (which means, that it must comply with very narrow tolerances) since an engagement of the slot edges along the overall length of the bush require extremely high pressing-in pressures which may result in deformations of the material surrounding the bore.

Upon inserting of a tension bush according to the invention there is only deformation of the pointlike projections 16 or the concavely shaped slot face surfaces 18, respectively with each other or with the opposing slot face surface. Therefore, even with wider tolerances of the bore a high fixing force is achieved, since the more or less pointlike engagement of the two slot face surfaces causes in view of the deformation a considerable additional tensional force in the tangential direction which considerably increases the desired radial fixing force. Numerous tests have shown that with a tension bush according to the invention fixing forces may be achieved which are multiples of fixing forces accomplished with known tension bushes.

It should be noted, that the pointlike projections are preferably arranged such that upon deformation at the opposing slotface surfaces they do not project into the interior of the bush. According to the invention this may be achieved by embossing the pointlike projections 16 according to FIG. 2 into the outer slot edge. The projection assumes then a droplike shape with a safe distance from the interior cylindrical surface of the wall 12, as it may clearly be gathered from FIG. 2.

The principle of the present invention is not limited to the embodiments as illustrated in the drawings and explained in the description. Thus, the slots need not be straight but may have a triangular or any other form. The opposing slot face surfaces need not be arranged in parallel to each other but may extent slightly conical over their overall length or at least part thereof.

We claim:

1. A tension bush comprising:
a bush formed of resilient material and being provided with a longitudinal slot formed by two spaced slot faces;
projection means provided on at least one slot face for deforming engagement with the other slot face when said bush is inserted into a bore of a bearing element;
and wherein said projection means includes at least one pointlike projection formed for essentially pointlike contact with the opposing slot face; and
wherein said projection means is formed and arranged such that after deforming engagement no deformed material projects into the interior of the bush; and
wherein said bush defines means exerting radial fixing forces against the bore sufficient for axial retention of the bush within the bore without a nut; and wherein there is means providing tensional force sufficient for an optimal fit for tension bushes used as bearings but not so great as to cause undesirable changes in the form of the material surrounding the bore other than said at least one point-like projection.

2. The tension bush of claim 1, further including a plurality of said pointlike projections arranged at spaced positions from each other along the two slot faces in an alternating sequence.

3. The tension bush of claim 1, further including a plurality of said pointlike projections arranged at spaced positions along the two slot faces in opposition to each other.

4. The tension bush of claim 1, further including a plurality of said pointlike projections of different size.

5. The tension bush of claim 1, wherein said projection means is embossed at an outer edge of said slot.

6. The tension bush of claim 1, wherein said projection means is a projection having a droplet-type form.

7. The tension bush of claim 1 further including bearing arrangement means defining said bearing element.

* * * * *